United States Patent [19]

Trabert et al.

[11] Patent Number: 4,806,587

[45] Date of Patent: Feb. 21, 1989

[54] HIGH-IMPACT POLYAMIDE MOULDING COMPOSITIONS

[75] Inventors: Ludwig Trabert, Krefeld; Christian Lindner, Cologne; Josef Merten, Korschenbroich; Heinrich Haupt, Krefeld, all of Fed. Rep. of Germany

[73] Assignee: Bayer Aktiengesellschaft, Leverkusen, Fed. Rep. of Germany

[21] Appl. No.: 775,590

[22] Filed: Sep. 13, 1985

[30] Foreign Application Priority Data

Sep. 22, 1984 [DE] Fed. Rep. of Germany ....... 3434821

[51] Int. Cl.$^4$ .............................................. C08L 77/00
[52] U.S. Cl. ..................................... 524/504; 525/66; 525/902
[58] Field of Search .................. 524/504; 525/66, 902

[56] References Cited

U.S. PATENT DOCUMENTS 4,338,406 7/1982 Sanderson et al. .................. 525/66
4,440,905 4/1984 Dunkelberger ...................... 525/66

FOREIGN PATENT DOCUMENTS 1200532 7/1970 United Kingdom .................. 525/66

*Primary Examiner*—John C. Bleutge
*Assistant Examiner*—A. Carrillo
*Attorney, Agent, or Firm*—Connolly & Hutz

[57] ABSTRACT

This invention relates to high-impact mixtures of polyamides and polymers based on polyacrylates or polybutadienes having improved processing behaviour and improved technological properties and to the production of these polymers by a multistage process.

11 Claims, No Drawings

HIGH-IMPACT POLYAMIDE MOULDING COMPOSITIONS

This invention relates to high-impact mixtures of polyamides and polymers based on polyacrylates or polybutadienes having improved processing behaviour and improved technological properties and to the production of the polymers by a multistage process.

Polyamide moulding compositions modified by graft polymers based on grafted polydiene or polyacrylate rubbers are widely used in the sports and automotive fields where such properties as high impact strength and high flexibility are highly valued. However, resistance to ageing, above all under heat, and flow behaviour are unsatisfactory for numerous applications. This applies in particular to highly blended, filled and reinforced polyamides.

Thus, although polyamide moulding compositions containing polyacrylate-based graft polymers (U.S. Pat. Nos. 3,668,274; 3,985,703 and 4,006,040) show improved ageing behaviour compared with polyamide moulding compositions containing grafted polydiene rubbers, the flow properties thereof are unsatisfactory. In addition, the toughness of such moulding compositions at low temperatures is inadequate. Filled and reinforced polyamide moulding compositions give mouldings spoiled by surface defects (for example white patches).

Although polyamide moulding compositions containing grafted polydiene rubbers (DE-OS No. 2,941,025, DE-OS No. 3,019,233, EP No. 00 58 316) are extremely tough at low temperatures, they show unsatisfactory thermal and poor flow behaviour.

Accordingly, an object of the present invention is to produce polyamide moulding compositions showing improved flow behaviour, better dispersibility, better surface quality and better toughness using particulate graft polymers.

According to the present invention, this object is achieved by using particulate polymers produced by a multistage process. In a first stage of this process, the graft polymer produced by emulsion polymerization and present in latex form is coagulated by addition of an electrolyte, in another stage polymerized vinyl monomer resin is added in latex form, more coagulating solution optionally being added at the same time as or after the latex. In a third stage, the resulting polymer is separated from the aqueous phase and worked-up into a powder having an average particle size of from 0.05 to 5 mm.

Accordingly, the present invention relates to thermoplastic moulding compositions of comprising:
(A) from 40 to 97%, preferably from 60 to 96%, more preferably from 70 to 95%, by weight, of a polyamide;
(B) from 3 to 60%, preferably from 4 to 40%, more preferably from 5 to 30%, by weight, of a polymer based on unsaturated monomers and consisting of:
  (B1) from 95 to 70%, by weight, based on (B), of a graft polymerisate based on at least partially cross-linked particulate rubbers having rubber contents of from 50 to 95%, by weight, and a glass transition temperature of $<20°$ C.;
  (B2) from 5 to 30%, by weight, based on (B) of at least one thermoplastic rubber-free vinyl monomer polymer of methyl methacrylate, alkylacrylate, styrene, α-methyl styrene and/or acrylonitrile;

characterized in that the polymer (B) is produced by a multi-stage process comprising:
a stage 1 in which the polymer (B1) produced by emulsion polymerization and present in latex form, or latex mixtures of the polymers (B1) and (B2), are coagulated at temperatures below $20°$ C. by pH reduction or by addition of an electrolyte,
a stage 2 in which polymer (B2) or the remainder of polymer (B2) is introduced in latex form into the polymer suspension obtained in stage 1 in such a quantity that a ratio by weight of (B1) to (B2) of from 95-70 to 5-30 is obtained, more coagulating solution optionally being introduced at the same time as or after the latex so that a solids to water ratio, by weight, of from 1:3 to 1:15 is obtained, and a following
stage 3 in which the resulting polymer is separated from the aqueous phase and worked-up into a powder having an average particle size of from 0.05 to 5 mm.

Various thermoplastic polyamides, preferably partially crylstalline polyamides, may be used as polyamide (A). Thus, it is possible to use partially crystalline polyamides of which the acid component consists completely or partially of terephthalic acid and/or isophthalic acid and/or suberic acid and/or sebacic acid and/or azelaic acid and/or adipic acid and/or cyclohexane dicarboxylic acid and of which the diamine component consists completely or partially of m- and/or p-xylylene diamine and/or hexamethylene diamine and/or 2,2,4-trimethyl hexamethylene diamine and/or 2,4,4-trimethyl hexamethylene diamine and/or isophorone diamine.

Polyamides which have been partially produced from $C_6$–$C_{12}$ lactams using one or more of the above-mentioned starting components are also suitable.

Particularly preferred partially crystalline polyamides are polyamide-6, polyamide-66 or corresponding copolyamides.

The polyamides should preferably have a relative viscosity (as measured using a 1%, by weight, solution in m-cresol at $25°$ C.) of from 2.0 to 5.0, more preferably from 2.5 to 4.0.

The particulate graft polymers (B1) of the moulding compositions according to the present invention contain in particular rubbers selected from diene or alkyl acrylate home- or co-polymers with styrene, acrylonitrile, methyl methacrylate, vinyl acetate or vinyl ether. They may be uncross-linked, partially cross-linked or highly-cross-linked and have particulate structures ranging from 50 to 1000 μm in size. Preferred graft monomers for the described graft bases are methyl methacrylate, styrene, acrylonitrile or mixtures thereof.

The graft polymers (B1) are produced by emulsion polymerization. The vinyl monomers, more especially methyl methacrylate, styrene, acrylonitrile, α-methyl styrene or mixtures thereof, are grafted onto emulsion rubbers having glass transition temperatures below $20°$ C.

Preferred acrylate rubbers as the graft base are products which contain as core a cross-linked diene rubber of one or more conjugated dienes, such as polybutadiene, or a copolymer of a conjugated diene with an ethylenically unsaturated monomer, such as styrene and/or acrylonitrile.

The graft base may contain from 0,1 to 80% by weight, preferably from 10 to 50%, by weight, of the polydiene core. The shell and core of the graft base independently of one another may be uncross-linked, partially cross-linked or highly crosslinked. The diene or alkyl acrylate rubbers should have a gel content of $\geq 80$, preferably $\geq 90\%$, by weight, preferably the rubber content of the graft polymerisates is 60–85, more preferably 70–75% by weight.

Preferred graft monomers for these acrylate rubber bases having a core-shell structure are methyl methacrylate, styrene, α-methyl styrene, acrylonitrile or mixtures of these monomers, but especially methyl methacrylate.

Core-shell graft rubbers of the type on question are described in DE-OS No. 3,006,804.

Suitable thermoplastic, rubber-free vinyl polymer (B2) are polymers of methyl methacrylate, alkyl acrylate, acrylonitrile, styrene, α-methyl styrene or mixtures thereof. These vinyl polymers may be uncross-linked, partially crosslinked or highly cross-linked and may be produced by emulsion polymerization. They are preferably uncross-linked and have Staudinger indices $[\eta]^*$, as measured in DMF at 25° C., of from 0.1 to 0.8, preferably from 0.15 to 0.4 dl/g Polymethyl methacrylate, styrene/acrylonitrile copolymers, methyl methacrylate/acrylonitrile copolymers, styrene/methylmethacrylate copolymers and α-methyl styrene copolymers are preferred.

*For the definition of $[\eta]$ see U. Hoffmann et al. "polymeranalytik I and II" Georg Thieme Verlag, Stuttgart, 1977.

These polymer mixtures (B) are prepared as follows: in a first stage, latices of the graft polymers (B1), optionally after stabilization, for example with phenolic antioxidants, at from 20° to 100° C., preferably from 50° to 100° C., are coagulated by the addition of acids, bases or water-soluble salts, optionally together with water, a sedimenting suspension of the polymers being formed with stirring, after which, in a second stage, polymer (B2) is introduced in latex form until the desired ratio, by weight, of (B1) to (B2) of from 95–70%, by weight, to 5–30%, by weight, preferably 95–80%, by weight, to 5–20%, by weight, is reached, more water and coagulating agent optionally being added so that a suspension having a solids to water ratio, by weight, of from 1:3 to 1:15 is obtained, and then in a third stage, the resulting polymer mixture is separated off from the suspension, for example by filtration or centrifugation and then drying, a polymer having an average particle diameter of from 0.05 to 5 mm being obtained.

Coagulation may be carried out semi-continuously or continuously, continuous coagulation being preferred.

The polymers (B) thus prepared show greatly improved flow behaviour which provides for easier dosing in the production of the moulding compositions according to the present invention and, hence, for optimal dispersion in the polyamide, blends having a particularly favourable range of properties being formed.

The moulding compositions according to the present invention may contain conventional additives, such as lubricants and mould release agents, nucleating agents, stabilizers, fillers and reinforcing materials, flameproofing agents and dyes.

The moulding compositions according to the present invention may contain up to 60%, by weight, based on the moulding composition as a whole, of fillers and/or reinforcing materials. Preferred reinforcing materials are glass fibres. Preferred fillers, which may also have a reinforcing effect, are glass beads, mica, silicates, feldspar, quartz, talcum, titanium dioxide, wolastonite.

Suitable flameproofing agents are known flameproofing agents, such as cyclic chlorine compounds, melamine and its salts, such as melamine cyanurate or melamine sulphate, or red phosphorus.

The moulding compositions may be produced in the conventional mixing units, such as mixing rolls, kneaders, single-screw or multi-screw extruders.

Although, in most cases, all the components are preferably mixed in a single step, it may sometimes be advisable to add one or two components at a later stage.

Thus, the moulding compositions according to the present invention may be produced in the above-mentioned mixing units by melting and homogenizing components (A) and (B) together or by incorporating the graft polymer (B) into a melt of the polyamide (A).

The temperature prevailing during production of the mixtures should be at least 10 C.° and preferably at most 80 C.° above the melting point of the polyamide.

The moulding compositions according to the present invention are distinguished by improved toughness. An outstanding feature is the improvement in the surface quality of reinforced and/or filled moulding compositions.

Commensurate with these improvements, the moulding compositions according to the present invention are suitable above all for the production of injection mouldings and extruded mouldings which are visible in use, as for example in the automotive sector for hub caps, fenders and bodywork trim.

EXAMPLES (A) Components used

I. Polyamide-6 having a relative viscosity of 3.5 (as measured using a 1%, by weight, solution in m-cresol at 25° C.)

II. Polyamide-66 having a relative viscosity measured in the same way as for I of 3.5.

III. Acrylate graft rubber

I. Coarse particle acrylate rubber base

In a reactor, the following emulsion was polymerized while stirring at 65° C. until the monomers had reacted almost completely (approx. 22 hours):

100.0 parts, by weight, of butadiene
1.8 parts, by weight, of the sodium salt of disproportionated abietic acid
0.247 part, by weight, of sodium hydroxide
0.3 part, by weight, of n-dodecyl mercaptan
1.029 part, by weight, of sodium ethylene diamine tetraacetate
0.023 part, by weight, of potassium persulphate
176 parts, by weight, of water A latex is obtained which contains butadiene polymer particles having an average diameter ($d_{50}$) of 0.1 μm in a concentration of from 35 to 36%. The polybutadiene particles have gel contents of from 90 to 95%, by weight, (as measured in toluene at 23° C.).

The following solutions are used:
Charge 1:
  12.4 parts, by weight, of the diene rubber latex of III.1
  313 parts, by weight, of water
Charge 2:
  0.82 parts, by weight, of potassium peroxydisulphate
  20 parts, by weight, of water
Feed 1:
  629 part, by weight, of n-butylacrylate
  1 parts, by weight, of triallyl cyanurate
Feed 2:
  700 parts, by weight, of water 5.9 parts, by weight, of the sodium salt of $C_{14}$–$C_{16}$ alkyl sulphonic acids.

Charge 1 is heated at from 65° to 68° C. after which 24 parts, by weight, of feed 1 are run in.

After initiation with charge 2, the rest of feed 1 and feed 2 are added over a period of 5 hours, followed by stirring for 4 hours. The latex has a solids content of 37%. The latex particle size is 0.4 μm. The polymer has a gel content of 93%, by weight, and a swelling index of 8, as measured in DMF at 23° C.

III. 2 Production of the graft rubbers consisting of 70%, by weight, of acrylate rubber III.1 and 30%, by weight, of polymethyl methacrylate.

III. 2.1 Production by direct graft polymerization in emulsion

The following solutions and latices are polymerized in a reactor:
Charge 1:
   1892 parts, by weight, of latex III.1
Charge 2:
   3 parts, by weight, of potassium peroxydisulphate
   120 parts, by weight, of water
Feed 1:
   300 parts, by weight, of methyl methacrylate
Feed 2:
   340 parts, by weight, of water
   8 parts, by weight, of the sodium salt of $C_{14}$–$C_{16}$ alkyl sulphonic acids Charge 2 is introduced into charge 1 at 70° C. Feed 1 and feed 2 are separately introduced over a period of 4 hours at 70° C., followed by polymerization for 4 hours at 70° C. The latex is then stabilized with 1.2 parts, by weight (per 100 parts, by weight, of graft polymer) of phenolic antioxidants.

The latex is then coagulated with a solution of $MgSO_4$ in water, filtered, washed and dried at 70° C.

The graft polymer contains 15%, by weight, of ungrafted polymethyl methacrylate having a Staudinger index $[\eta]$ of 0.27 dl/g as measured in DMF at 25° C.

III. 2.2 Production by coupled emulsion graft polymerization and subsequent graft polymerization in broken emulsion The following solutions and latices are polymerized in a reactor:
Charge 1:
   2162 parts, by weight, of latex III.1
Charge 2:
   2 parts, by weight, of potassium peroxydisulphate
   120 parts, by weight, of water
Feed 1:
   200 parts, by weight, of methyl methacrylate
Feed 2:
   6 parts, by weight, of the sodium salt of $C_{14}$–$C_{16}$ alkyl sulphonic acids
   396 parts, by weight, of water Charge 2 is introduced into charge 1 at 70° C., after which feed 1 and feed 2 are introduced over a period of 4 hours at 70° C., followed by polymerization for 4 hours at 70° C.

The graft polymer latex is further treated as follows:
Charge 1:
   5525 parts, by weight, of water
   107 parts, by weight, of $MgSO_4.xH_2O$ (magnesium sulphate)
Feed 1:
   4106 parts, by weight, of latex (see above)
Feed 2:
   160 parts, by weight, of methyl methacrylate
Activator:
   1.3 parts, by weight, of potassium peroxydisulphate
   78 parts, by weight, of water Charge 1 is heated with thorough stirring to from 70° to 73° C. Feed 1 is introduced over a period of 1 hour. Feed 2 is then introduced over a period of 30 minutes, followed by activation with the activator solution. After heating to 80° C., the whole is stirred for 2 hours, heated to 90° C. and then stirred for another 2 hours. After subsequent stabilization with 2 parts, by weight, of phenolic antioxidants, the graft polymer is worked-up by filtration, washing and drying.

The graft polymer contains 16%, by weight, of ungrafted polymethyl methacrylate having a Staudinger index $[\eta]$ of 0.31 dl/g as measured in DMF at 25° C.

III. 2.3 Production of the graft rubbers according to the present invention

The emulsion graft polymerization described in III. 2.2 is repeated. The graft copolymer latex is further treated as follows:

2602 parts, by weight, of the graft copolymer latex III. 2.2 stabilized with phenolic antioxidants are introduced into a charge heated to from 70° to 80° C. of
1500 parts, by weight, of $MgSO_4.xH_2O$ (magnesium sulphate)
5000 parts, by weight, of water.

The latex coagulates to form a sedimenting graft copolymer suspension which is continuously stirred. Thereafter, 286 parts, by weight, of vinyl monomer resin latex III. 2.3.1 are added, followed by cooling, filtration, washing and drying at from 70° to 80° C.

The graft copolymers contain 18%, by weight, of ungrafted vinyl monomer resin. The Staudinger indices $[\eta]$ of these products are mixtures of 0.16 (from the emulsion process) and the $[\eta]$-values of the products III. 2.3.1.1–2.3.1.5.

III. 2.3.1 Production of the vinyl monomer resin latices 6 parts, by weight, of potassium peroxydisulphate dissolved in 50 parts, by weight, of water are introduced into a charge heated to 70° C. of 980 parts, by weight, of water and 5 parts, by weight, of the sodium salt of $C_{14}$–$C_{16}$ alkyl sulphonic acids. The following solutions are then separately introduced over a period of 4 hours at 70° C.:
(a)
   x parts, by weight, of monomer
   y parts, by weight, of t-dodecyl mercaptan
(b)
   700 parts, by weight, of water
   20 parts, by weight, of the sodium salt of $C_{14}$–$C_{16}$ alkyl sulphonic acids.

After the solutions have been added, polymerization is carried out over a period of 4 hours. The latices obtained have a solids content of 34.9%, by weight.

TABLE 1

| Product | Solutions used (a) | | | | |
| --- | --- | --- | --- | --- | --- |
| | III. 2.3.1.1 | III. 2.3.2.2 | III. 2.3.1.3 | III. 2.3.1.4 | III. 2.3.1.5 |
| (parts, by weight) | 993 MMA[(1)] | 933 MMA | 993 MMA | 833 MMA 100 S[(2)] | 933 MMA |

TABLE 1-continued

| Product | Solutions used (a) | | | | |
|---|---|---|---|---|---|
| | III. 2.3.1.1 | III. 2.3.2.2 | III. 2.3.1.3 | III. 2.3.1.4 | III. 2.3.1.5 |
| (parts, by weight) | 9 DDM[(3)] | 6 DDM | 4 DDM | 9 DDM | 1 DDM |

[(1)]Methyl methacrylate
[(2)]Styrene
[(3)]dodecyl mercaptan

TABLE 2

| Staudinger indices of products III. 2.3.1.1–III. 2.3.1.5 | | | | | |
|---|---|---|---|---|---|
| Product | III. 2.3.1.1 | III. 2.3.1.2 | III. 2.3.1.3 | III. 2.3.1.4 | III. 2.3.15 |
| $[\eta]$ DMF (dl)/g | 0.19 | 0.28 | 0.45 | 0.23 | 0.67 |

[(1)]Staudinger index $[\eta]$ as measured in DMF at 25° C.

III. 2.4 Test for comparison with the present invention

The graft copolymer emulsion (latex) prepared in III. 2.2 is mixed with a vinyl monomer resin latex (of the product III. 2.3.1.1) prepared in accordance with III. 2.3.1 in a ratio of 90 parts, by weight, of III. 2.2 to 10 parts, by weight, of III. 2.3.1.1. The latex mixture is then coagulated with magnesium sulphate solution at from 70° to 90° C., filtered and dried. The resin component of this product which remains ungrafted is identical with that of the polymer III. 2.2.

IV. Diene rubber

IV.1 Coarse-particle butadiene rubber base

The following emulsion is polymerized over a period of about 110 hours at from 60° to 80° C.:
100.0 parts, by weight, of butadiene
70 parts, by weight, of water
1.146 parts, by weight, of the sodium salt of disproportionated abietic acid
0.055 part, by weight, of sodium ethylene diamine tetraacetate
0.137 part, by weight of sodium hydride
0.028 part, by weight, of sodium hydrogen carbonate
0.282 part, by weight, of potassium persulphate A latex is obtained which contains polybutadiene particles having an average diameter ($d_{50}$) of 0.4 μm in a concentration of approximately 58%, by weight. The polybutadiene particles have gel contents of from 90 to 91%, by weight, (as measured in toluene at 23° C.).

IV. 2 Production of the graft rubbers

IV. 2.1 Production by direct graft polymerization in emulsion 4200 parts, by weight, of latex IV.1 and 1500 parts, by weight, of water are introduced into a reactor at 65° C. After initiation with
6 parts, by weight of potassium peroxydisulphate and 200 parts, by weight, of water,
the following solutions are added over a period of 4 hours at 65° C.:
(a) 826 parts, by weight, of methyl methacrylate
(b) 1600 parts, by weight, of water 40 parts, by weight, of the sodium salt of $C_{14}$–$C_{16}$ alkyl sulphonic acids.

Polymerization is then completed over a period of 4 hours at 65° C. After stabilization with 2%, by weight, of phenolic antioxidants, based on polymer solids, the latex is coagulated with a solution of magnesium sulphate in acetic acid, washed and dried.

IV. 2.2 Production of the butadiene graft rubbers in accordance with the present invention The prodcedure is the same as in IV. 2.1. The following solutions are used as solutions (a) and (b):
(a)
620 parts, by weight, of methyl methacrylate
(b)
860 parts, by weight, of water,
40 part, by weight, of the sodium salt of disproportionated abietic acid,
30 parts, by weight, of 1N sodium hydroxide.

After polymerization and stabilization of the latex, the latex is introduced into the following solution with stirring at 70° C.:
15,000 parts, by weight, of water,
300 parts, by weight, of magnesium sulphate,
300 parts, by weight, of acetic acid.

After complete coagulation of the latex, 440 parts, by weight, of the resin latex III. 2.3.1.1 are introduced. After heating to 98° C., the product is cooled, filtered, washed and dried.

Composition of the products

Products IV. 2.1 and IV. 2.2 are directly comparable with one another and have a rubber content of 75%, by weight, and are grafted with 25%, by weight, of methyl methacrylate.

TABLE 4

| | Composition of the graft products | | | |
|---|---|---|---|---|
| Type | Produced in accordance with | Staudinger $[\eta]$ dl/g | Ungrafted vinyl monomer resin type | %, by weight |
| K | IV. 2.1 | 0.27 | MMA | 15 |
| L | IV. 2.2 | 0.19 | MMA | 10 |

TABLE 3

| | Composition of the graft products | | | |
|---|---|---|---|---|
| Type | Produced in accordance with | Staudinger index dl/g | Ungrafted resin type | %, by weight |
| A | III. 2.1 | 0.27 | MMA[(1)] | 15 |
| B | III. 2.2 | 0.31 | MMA | 16 |
| C | III. 2.3 | 0.19 | MMA | 10 |
| D | III. 2.3 | 0.28 | MMA | 10 |
| E | III. 2.3 | 0.45 | MMA | 10 |
| F | III. 2.3 | 0.23 | MMA-S[(2)] | 10 |
| G | III. 2.3 | 0.67 | MMA | 10 |
| H | III. 2.2 | 0.27 | MMA | 10 |
| I | III. 2.4 | 0.31 | MMA | 16 |

[(1)]Methyl methacrylate
[(2)]Methyl methacrylate-styrene copolymer

B. Production and grafting of the moulding compositions

EXAMPLES 1 TO 22

The components were melted and homogenized in a continuous twin-screw extruder. The barrel temperatures were selected in such a way that the melt temperatures indicated in Tables 5 to 7 were maintained. The melt strand was degassed before issuing from the die, cooled in water, granulated and dried.

addition, gloss was determined in accordance with ASTM-D 435. The results are shown in Table 7.

TABLE 5

Composition and properties of the moulding compositions

| | Component I Polyamide | | Component III/IV Graft product | | Notched impact strength | | Flow spiral |
|---|---|---|---|---|---|---|---|
| Example | type | %, by weight | type | %, by weight | +20° C. | −20° C. | (cm) |
| 1 | PA-6 | 80 | A | 20 | 35 | 8 | 27 |
| 2 | PA-6 | 80 | B | 20 | 45 | 10 | 28 |
| 3 | PA-6 | 80 | C | 20 | 50 | 13 | 30 |
| 4 | PA-6 | 80 | D | 20 | 55 | 15 | 35 |
| 5 | PA-6 | 80 | E | 20 | 50 | 12 | 30 |
| 6 | PA-6 | 80 | F | 20 | 45 | 10 | 26 |
| 7 | PA-6 | 80 | G | 20 | 40 | 8 | 26 |
| 8 | PA-6 | 80 | H | 20 | 43 | 10 | 26 |
| 9 | PA-6 | 80 | I | 20 | 38 | 8 | 25 |
| 10 | PA-6 | 80 | K | 20 | 50 | 20 | 17 |
| 11 | PA-6 | 80 | L | 20 | 65 | 45 | 25 |

The melt temperature in the extruder was 280° C. and in the injection moulding machine 270° C.; the mould temperature was 80° C. The percentages, by weight, are based on the moulding compositions as a whole.

TABLE 6

Composition and properties of the moulding compositions

| | Component II Polyamide | | Component III/IV Graft Product | | Notched impact strength (kJ/m$^2$) | | Flow spiral |
|---|---|---|---|---|---|---|---|
| Example | type | %, by weight | type | %, by weight | +20° C. | −20° C. | (cm) |
| 12 | PA-66 | 80 | A | 20 | 30 | 6 | 35 |
| 13 | PA-66 | 80 | B | 20 | 42 | 8 | 38 |
| 14 | PA-66 | 80 | C | 20 | 45 | 10 | 40 |
| 15 | PA-66 | 80 | D | 20 | 52 | 13 | 45 |
| 16 | PA-66 | 80 | E | 20 | 46 | 12 | 45 |
| 17 | PA-66 | 80 | F | 20 | 44 | 10 | 40 |
| 18 | PA-66 | 80 | G | 20 | 38 | 8 | 36 |
| 19 | PA-66 | 80 | H | 20 | 40 | 10 | 38 |
| 20 | PA-66 | 80 | I | 20 | 35 | 8 | 36 |
| 21 | PA-66 | 80 | K | 20 | 50 | 15 | 25 |
| 22 | PA-66 | 80 | L | 20 | 55 | 30 | 35 |

The melt temperature in the extruder and in the injection moulding machine was 280° C. The mould temperature was 90° C. The percentages, by weight, are based on the moulding compositions as a whole.

TABLE 7

Composition and properties of the moulding compositions

| | Component I Polyamide | | Component III/IV Graft product | | Notched impact strength (kJ/m$^2$) | | Gloss value (as determined in accordance |
|---|---|---|---|---|---|---|---|
| Example | type | %, by weight | type | %, by weight | glass fibre | 20° C. | with ASTM-D 435) |
| 23[2] | PA-6 | 60 | A | 10 | 30 | 18 | 62 |
| 24[2] | PA-6 | 60 | B | 10 | 30 | 20 | 65 |
| 25 | PA-6 | 60 | C | 10 | 30 | 30 | 80 |
| 26[2] | PA-6 | 60 | D | 10 | 30 | 17 | 60 |
| 27[2] | PA-6 | 60 | E | 10 | 30 | 20 | 65 |
| 28 | PA-6 | 60 | F | 10 | 30 | 26 | 75 |

[1]Determined on 118 mm diameter round discs (surface quality increases with increasing gloss value)
[2]Comparison Example The moulding compositions were injection-moulded to form standard small test bars which were tested for notched impact strength (in accordance with DIN 53 453) at the temperatures indicated and for flow.

EXAMPLES 23 TO 28

As in Examples 1 to 22, the graft polymer was mixed with molten polyamide in an extruder. 6 mm long glass fibres were then introduced into and uniformly distributed in the mixed melt.

After the melt had been degassed before issuing from the die, followed by cooling in water, granulation and drying, standard small test bars were prepared in the same way as described above and tested for notched impact strength (in accordance with DIN 53 453). In The latex particle sizes mentioned in the test are $d_{50}$ values and were determined by ultracentrifuge measurements (c.f. W. Scholtan et. al., Colloid Z. Polymere, 250 (1972), page 783).

We claim:

1. A thermoplastic moulding composition which comprises
 (A) from 40 to 97%, by weight of polyamide; and
 (B) from 3 to 60% by weight, of olefinically-unsaturated monomer-based polymer comprising:
  (B1) from 95 to 70% by weight, based on (B), of a graft rubber based on at least partially cross-linked, particulate rubber having a rubber content of from 50 to 95%, by weight, and a glass transition temperature below 20° C.; and (B2) from 5 to 30%, by weight, based on (B), of a methylmethacrylate homopolymer having a Staudinger Index of from 0.1 to 0.45 dl/g, as measured in DMF at 25° C.; (B) being obtained in a multistage process comprising a first stage wherein (B1) produced by emulsion polymerization and present in latex form is coagulated at temperatures above 20° C. by pH reduction, by electrolyte addition and by combinations thereof; a second stage wherein (B2) is introduced in latex form into the polymer suspension resulting from the first stage to give a weight ratio of (B1):(B2) of from 95:5 to 70:30, more coagulating solution optionally being added simultaneously or subsequently to give a weight ratio of solids:water of from 1:3 to 1:15, and a third stage wherein the resulting polymer is separated from the aqueous phase and worked-up to give a powder having an average particle size of from 0.05 to 5 mm.

2. A composition as claimed in claim 1 wherein from 60 to 96%, by weight, of (A) and from 4 to 40%, by weight, of (B) are present.

3. A composition as claimed in claim 2 wherein from 70 to 95%, by weight of (A) and from 5 to 30%, by weight, of (B) are present.

4. A composition as claimed in claim 1 wherein the rubber content of (B1) is from 60 to 85%, by weight.

5. A composition as claimed in claim 4 wherein the rubber content of (B1) is from 70 to 75%, by weight.

6. A composition as claimed in claim 1 wherein (B1) is a graft polymer of methyl methacrylate on diene rubber or alkyl acrylate rubber.

7. A composition as claimed in claim 1 wherein (B1) comprises diene or alkyl acrylate rubber which has a gel content of from $\geq 80\%$, by weight.

8. A composition as claimed in claim 7 wherein the gel content of said (B1) rubber is $\geq 90\%$, by weight.

9. A composition as claimed in claim 1 wherein (B1) comprises alkyl acrylate rubber which has a polybutadiene core.

10. A composition as claimed in claim 1 wherein up to 60%, by weight, of glass fibres are present.

11. A composition as claimed in claim 1 wherein (B2) has a Staudinger Index, as measured in DMF at 25° C., of from 0.1 to 0.4 dl/g.

* * * * *